US012355557B2

(12) United States Patent
Kumar et al.

(10) Patent No.: US 12,355,557 B2
(45) Date of Patent: Jul. 8, 2025

(54) FREQUENCY JAMMING DETECTION AND JAMMER DIRECTION DETECTION

(71) Applicant: InstaJam, LLC, Cary, NC (US)

(72) Inventors: Achintya Kumar, Cary, NC (US); Felicia Chen, Cary, NC (US); Davon Prewitt, Atlanta, GA (US); Sahil Gupta, Seattle, WA (US)

(73) Assignee: InstaJam, LLC, Cary, NC (US)

( * ) Notice: Subject to any disclaimer, the term of this patent is extended or adjusted under 35 U.S.C. 154(b) by 496 days.

(21) Appl. No.: 17/954,946

(22) Filed: Sep. 28, 2022

(65) Prior Publication Data

US 2023/0101999 A1 Mar. 30, 2023

Related U.S. Application Data

(60) Provisional application No. 63/249,376, filed on Sep. 28, 2021.

(51) Int. Cl.
*H04K 3/00* (2006.01)

(52) U.S. Cl.
CPC ................ *H04K 3/22* (2013.01); *H04K 3/25* (2013.01)

(58) Field of Classification Search
CPC .. H04K 3/22; H04K 3/00; H04K 3/25; H04K 3/45; H04K 2203/16; H04K 3/82
See application file for complete search history.

(56) References Cited

PUBLICATIONS (JP H07122555 B2), Kurihara, Electronic Warefare Equipment, Dec. 1995, pp. 1-4 (Year: 1995).*

* cited by examiner

*Primary Examiner* — Keith Ferguson
(74) *Attorney, Agent, or Firm* — Dority & Manning, P.A.

(57) ABSTRACT

A mobile device sends to a radio communicatively coupled to the mobile device, an instruction to monitor a frequency band. It is determined that the frequency band is jammed by a jamming source. The mobile device receives, from the radio, signal waveform information corresponding to the frequency band that is received by the radio from a 360 span about the radio. Based on the waveform information a direction of the jamming source is determined. The mobile device presents on a display device information that indicates that the frequency band is being jammed, and a direction of the jamming source with respect to a current location of the radio.

20 Claims, 17 Drawing Sheets

600

FREQUENCY JAMMING DETECTION AND JAMMER DIRECTION DETECTION

RELATED APPLICATION

This application claims the benefit of U.S. Provisional Application No. 63/249,376, filed on Sep. 28, 2021, entitled "MOBILE DEVICE FOR DETECTING AND DISPLAYING RADIO FREQUENCY JAMMING," the disclosure of which is hereby incorporated herein by reference in its entirety.

BACKGROUND

An entity may intentionally attempt to "jam" one or more frequency bands that the entity believes other entities are using to communicate.

SUMMARY

In one embodiment a method is provided. The method includes sending, by a first mobile device to a radio communicatively coupled to the first mobile device, an instruction to monitor a frequency band. The method further includes determining that the frequency band is jammed by a jamming source. The method further includes receiving, by the first mobile device from the radio, signal waveform information corresponding to the frequency band that is received by the radio from a 360 span about the radio. The method further includes determining, by the first mobile device based on the signal waveform information, a direction of the jamming source. The method further includes presenting, by the first mobile device on a display device, information that indicates that the frequency band is being jammed, and a direction of the jamming source.

In another embodiment a mobile computing device is provided. The mobile computing device includes a memory, and a processor device coupled to the memory configured to send, to a radio communicatively coupled to the first mobile device, an instruction to monitor a frequency band. The processor device is further configured to determine that the frequency band is jammed by a jamming source. The processor device is further configured to receive, from the radio, signal waveform information corresponding to the frequency band that is received by the radio from a 360 span about the radio. The processor device is further configured to determine, based on the signal waveform information, a direction of the jamming source. The processor device is further configured to present, on the display device, information that indicates that the frequency band is being jammed, and a direction of the jamming source.

In another embodiment another method is provided. The method includes receiving, by a first mobile device from a second mobile device, a first message that a first frequency band is being jammed, a first direction of a jamming source, and a first location of the second mobile device. The method further includes receiving, by the first mobile device from a third mobile device, a second message that the first frequency band is being jammed, a second direction of the jamming source, and a second location of the second mobile device. The method further includes generating, by the first mobile device, user interface imagery that depicts a map of a geographic area that encompasses the first mobile device, the second mobile device and the third mobile device. The method further includes overlaying, on the map, location indicators that identify locations of the first mobile device, the second mobile device and the third mobile device with respect to the geographic area. The method further includes overlaying, on the map, direction indicators that indicate a direction of the jamming source with respect to the first location and the second location. The method further includes presenting the user interface imagery on a display device.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
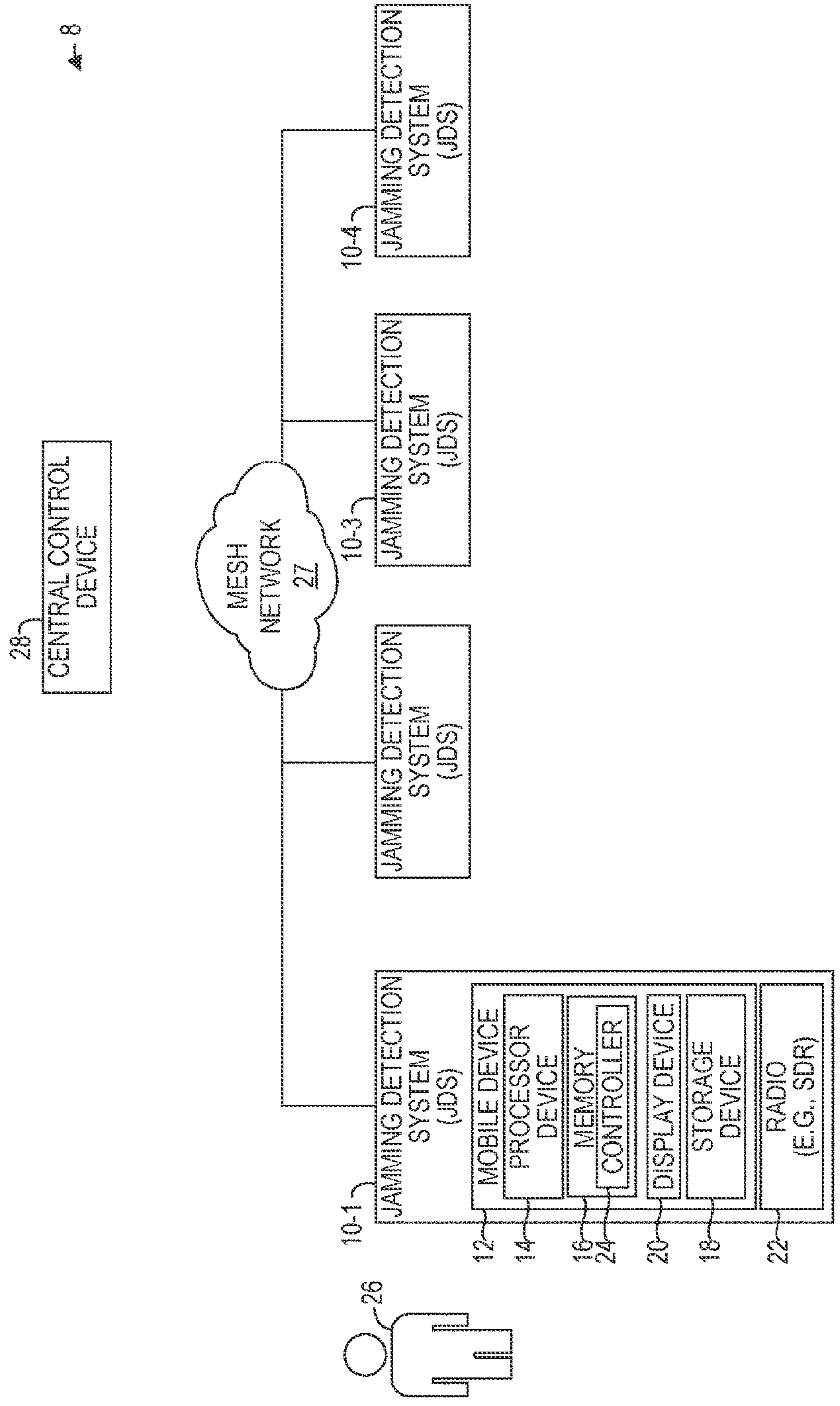
FIG. 1 is a block diagram of an environment that includes a jamming detection system (JDS) for detecting radio frequency (RF) jamming according to one embodiment.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as “first message” and “second message,” and does not imply an initial occurrence, a quantity, a priority, a type, an importance, or other attribute, unless otherwise stated herein. The term “about” used herein in conjunction with a numeric value means any value that is within a range of ten percent greater than or ten percent less than the numeric value. As used herein and in the claims, the articles “a” and “an” in reference to an element refers to “one or more” of the element unless otherwise explicitly specified. The word “or” as used herein and in the claims is inclusive unless contextually impossible. As an example, the recitation of A or B means A, or B, or both A and B. The word “data” may be used herein in the singular or plural depending on the context.

The term “frequency band” as used herein refers to one frequency or a consecutive series of frequencies that range from a first frequency to a second frequency. An entity may intentionally attempt to “jam” a frequency band that the entity believes other entities are using to communicate. The term “jamming” as used herein refers to the wireless transmission of energy in an attempt to limit or disrupt wireless communications.

When frequency bands used for communications are jammed (e.g., energy being transmitted on the frequency band inhibits or otherwise disrupts communications using the frequency bands), it may be desirable to determine which frequency bands are being jammed and which frequency bands are not being jammed, and it may also be desirable to determine a direction of the jamming source. It may be even more desirable to determine a location of the jamming source.

The embodiments disclosed herein include a jamming detection system (JDS), that includes a mobile device, such as a laptop computer, a tablet computer, a mobile phone (such as an Android or iOS smart phone), or the like, that interfaces with a radio, such as a software defined radio (SDR), to detect frequency bands that are being jammed and the direction of the jamming source. The mobile device may be a special-purpose mobile device, or the mobile device may be a generally available mobile device such as an Android or iPhone mobile device that has software installed (sometimes referred to herein as “InstaJam”, “the plugin”, or the “controller”) that implements the functionality described herein. The mobile device receives signal information from the SDR and monitors desired frequency bands to detect those frequency bands that are being jammed. In some embodiments, the mobile device identifies a direction of the jamming source. In some embodiments, the mobile device may communicate with other mobile devices via, for example, a mesh network that facilitates message propagation among the plurality of mobile devices, such that the mobile device can identify a location of the jamming source via, for example, triangulation.

In some embodiments, user interfaces (UIs) provide information to identify jammed frequency bands and unjammed frequency bands, as well as direction and/or locations of one or more jamming sources may be presented to the user. The UIs may also display a heatmap, which includes the presentation of a map of a geographic area and points that correspond to the current and recent previous locations of JDSs that are connected to the mesh network. The heatmap may also include information that indicates where jamming has been detected, direction finding points (such as an arrow pointing in the direction of a jamming source), and/or jammer localization points (such as an indicator of a location of a jamming source). The points indicating where jamming has been detected may fade over time as points get older.

FIG. 1 is a block diagram of an environment 8 that includes a JDS 10-1 for detecting radio frequency jamming by a radio frequency source according to one embodiment. The system includes a mobile device 12 that includes a processor device 14, a memory 16, a storage device 18 and a display device 20. The mobile device 12 may comprise, for example, a laptop computer, a tablet computer, a mobile phone (such as an Android or iOS smart phone), or the like. The mobile device 12 is communicatively coupled to a radio 22, which, in this example, is a software-defined radio (SDR). The mobile device 12 may be communicatively coupled to the radio 22 via any suitable wired or wireless communications medium, such as a USB or USB-C connector, Wi-Fi®, Bluetooth, ZigBee or the like. A controller 24 implements portions of the functionality that will be described herein. In some embodiments, the controller 24 may be downloaded onto the mobile device 12 to implement the functionality described herein. The controller 24, among other features that will be described in greater detail below, operates to collect signal waveform information, such as waveforms at various frequency bands, from the radio 22. The controller 24 also operates to analyze the signal waveform information and determine whether one or more frequency bands are being jammed by a source of RF energy.

The controller 24 may also, as described in greater detail below, present user interfaces (UIs) on the display device 20 to obtain information from a user 26 and present information to the user 26. As an example, the UI may allow the user 26 to add, edit, or delete frequency bands that the user 26 wishes to monitor or no longer monitor.

The controller 24 may use digital signal processing such as, by way of non-limiting example, a Fast Fourier Transform (FFT) on the received signal waveform information or, in some implementations, a machine learning model, to detect jamming information across various frequency bands. The controller 24 may store quadrature (IQ) samples and jamming information for each frequency band to the storage device 18.

The environment 8 may also include a plurality of other JDSs 10-2-10-4, each of which may have a mobile device 12 and radio 22 and be substantially configured as described herein with regard to the JDS 10-1. The JDSs 10-1-10-4 may be referred to collectively or generally as the JDSs 10. While for purposes of illustration only four JDSs 10 are illustrated, it will be apparent that the environment 8 may comprise any number of JDSs 10, such as, for example, tens, hundreds, or thousands of JDSs 10.

In some implementations, the JDSs 10 can connect to one another over a mesh network topology to aggregate directional and RF signal information from any number of JDSs 10. Each mobile device 12 in a JDS 10 may include a mesh node to implement the aspects of a mesh network 27 described herein. The mobile devices 12 can also, if desired, relay information to a central control device 28 to collectively monitor the frequency bands individually monitored by each mobile device 12. In some embodiments, a mobile device 12 in one of the JDSs 10 may be designated as the central control device 28. The mesh network 27 may also propagate new frequency bands to monitor for each JDS 10.

The mesh network 27 may facilitate the distribution of jamming information determined by each JDS 10 among all the JDSs 10. In some implementations a JDS 10 may utilize a combination of Line-of-Sight (LOS) and Beyond-Line-of-Sight (BLOS)/satellite communication (SATCOM) devices to send messages quickly to other JDSs 10 in close proximity and those beyond radio signal ranges. By way of non-limiting example, a LOS device may be a GoTenna Pro X LOS device and a BLOS device may be a SomeWear puc device. As a JDS 10 receives a message via the mesh network 27, the JDS 10 propagates the message to nearby JDSs 10 such that a message is ultimately propagated to each JDS 10. Each message may include a unique identifier and be stored locally, such as in a data structure, such as a database, on each respective JDS 10. Duplicate messages may therefore be identified and dropped.

In some embodiments, each JDS 10 may broadcast out to other JDSs 10 messages (sometimes referred to herein as "markers") that contain information that identifies the message type, the frequency bands that the JDS 10 has determined as being jammed, and for each such frequency band, if available, a direction or a location of the jamming source. The term jamming source refers to an electromagnetic radiation transmitter that transmits energy on one or more frequency bands. The information may also include, for each message, a frequency band identifier that identifies a frequency band, a jamming status, a timestamp, a latitude and longitude of the JDS 10, direction information (e.g., degrees with respect to north, sometimes referred to herein as "direction find" data points) of a determined direction of the jamming source, and an icon identifier that identifies an icon to be presented on the heatmap. When a JDS 10 receives this information from other JDSs 10, the receiving JDS 10 may store the information in a data structure, such as a database. The JDS 10 may also plot on a map the status of frequency bands analyzed at the locations of the other JDSs 10. The receiving JDS 10 may also determine if a localization that identifies a jammer's location can be performed. Typically, three independent direction samples are needed. If the JDS 10 has the direction of a jammer from three locations, the JDS 10 may perform a triangulation operation to identify a location of the jamming source.

A jam status message type also includes metadata about the frequency, jam status determination, and if a direction find was completed, a direction angle. A predicted jammer message type includes metadata about the predicted latitude and longitude of the jamming source and the individual direction find data points used to create the triangulation prediction. Each direction find data point may include the timestamp of the direction find and the degrees with respect to north that were calculated.

If a JDS 10 receives three initial messages that include direction find data points, the JDS 10 may perform a triangulation calculation to predict the location of a jamming source. If the JDS 10 subsequently receives additional direction find data points from a JDS 10, or generates its own direction find data points using the antenna on the corresponding radio 22 (as will be described in greater detail below), the JDS 10 performs a new triangulation calculation to increase the accuracy of the predicted location of the jamming source. The JDS 10 may also utilize only those direction find data points that have been generated by a JDS 10 within a predetermined timeframe, such as only those generated in the previous 30 minutes. Such timeframe may be user configurable. The JDS 10 may also rebroadcast the newly predicted location of the jamming source to other JDSs 10, and update the heatmap with the newly estimated location of the jamming source.

In some embodiments, the mobile device 12 presents a UI via which the user 26 can identify frequency bands for monitoring. The mobile device 12 may then instruct the radio 22 to monitor the identified frequency bands. The radio 22 may sample the waveforms of the identified frequency bands and provide the signal waveform information in the form of sampled waveforms to the mobile device 12. The mobile device 12 may perform a Fast Fourier transform on the samples to convert the raw IQ samples received from the radio 22 into amplitude and power information.

As discussed above, the embodiments also facilitate the creation of the mobile mesh network 27 to monitor the defined radio frequency communications spectrum. The plurality of mobile devices 12 in the JDSs 10 can choose to form an IP-based mesh network connection, enabling the JDSs 10 to collectively monitor the entire communications spectrum, wherein some JDSs 10 may monitor different frequency bands. In some embodiments, the mesh network node on a mobile device 12 in a JDS 10 may request another mobile device 12 in another JDS 10 to monitor one or more frequency bands, to distribute workload across the JDSs 10. The mesh network node in one mobile device 12 may determine that the mobile device 12 is reaching a processing capacity limit and direct another mobile device 12 to begin monitoring a frequency band previously monitored by the mobile device 12 to reduce the processing load on the mobile device 12. The mesh network 27 can also distribute the jamming information computed from each JDS 10 to each other JDS 10. The mesh network 27 propagates a message to nearby JDSs 10, eventually propagating each message to the entire operating zone of JDSs 10. A singular message update may be distributed to every JDS 10 in the network exactly once, discarding duplicates of the same message identifier. A UI can be generated that visualizes the jamming record for each frequency band over time to visualize the extent and direction of jamming source(s) using, for example, a heatmap display.

Figure 2:
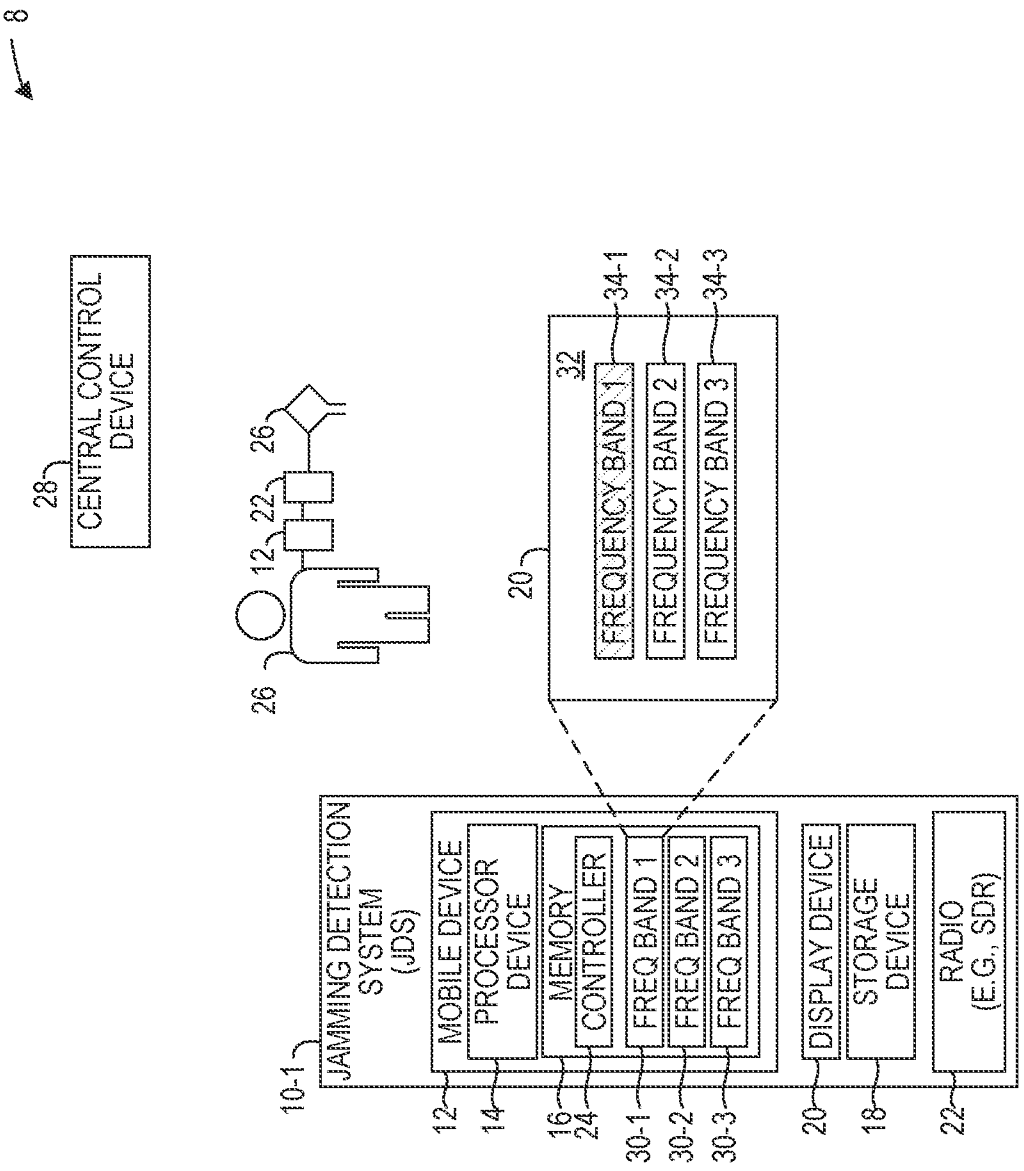
FIG. 2 is a block diagram illustrating a mechanism for detecting RF jamming according to one embodiment.

FIG. 2 is a block diagram illustrating a mechanism for detecting RF jamming according to one embodiment. As will be described in greater detail below, the user 26 may input, to the mobile device 12 via a user interface, one or more frequency bands to monitor for jamming. In this example, the user 26 has requested that three frequency bands 30-1-30-3 be monitored. The controller 24 sends frequency band identifiers that identify the frequency bands 30-1-30-3 to the radio 22 and receives, in response, signal waveform information of such frequency bands 30-1-30-3. The controller 24 determines whether any of the frequency bands 30-1-30-3 are jammed based on the signal waveform information.

The controller 24 may receive raw amplitude and power values generated by the radio 22, or may receive signal waveform information in any other suitable format, such as signal waveform information in an in-phase and quadrature (IQ) format. Such information may be received via any suitable mechanism, including, by way of non-limiting example, a websocket or inter-process communication (IPC) mechanism, to make a jamming determination based on the below discussed algorithms.

In the latter situation, radio 22 samples the waveform in in-phase and quadrature (IQ) format and provides signal waveform information in the form of IQ samples to the controller 24 at a particular sample rate. The controller 24 may perform a Fast Fourier transform (FFT) over the samples to convert the IQ samples into amplitude and power values. The controller 24 may use a spectral flatness detection system that receives the list of amplitude and power values. Flatness may be defined as the geometric mean divided by the arithmetic mean of all features, over the Fourier spectrum as the measure. The resulting flatness measure is a number within the range of 0 to 1. 1 is denoted as flat noise and 0 is denoted as pure tone.

This flatness measure is then compared to a list of non-overlapping ranges which represent each jamming status (no signal, not jammed, and jammed). Such ranges may be determined based on captured experimental data and manual visual determination of the plotted information into classified categories of Jammed, Unjammed, and No Signal. The range the measure fits into is the determined jamming status.

In another embodiment, the controller 24 may check each frequency band's amplitude and power values to see if it exceeds the user-defined threshold for what is considered jamming. The controller 24 may determine an additional threshold for noise by sampling the environment and typical usage of the frequency band (this basically determines a baseline normal "noise level" in an environment. Anything that exceeds this baseline by a certain threshold is determined to be "jamming").

The controller 24 may also perform a machine learning model waveform classification based on IQ samples as a means to filter out friendly communication and target enemy jamming more easily. This model is utilized when the input data stream consists of IQ samples. The machine learning model is trained to receive IQ samples and frequency band identifiers and outputs a jamming status. The machine learning model is capable of transfer learning so that users can tune the existing model weights with samples from specialized environments to optimize performance of the machine learning model.

The controller 24 may also perform a machine learning model waveform classification based on the amplitude and power data for each frequency band as a means to filter out friendly communication and target enemy jamming more easily. This machine learning model is utilized when the input data stream consists of raw amplitude and power data rather than IQ samples.

The machine learning model is trained to receive raw amplitude and power data as identifiers and outputs a jamming status. The machine learning model is capable of transfer learning so that users can tune the existing model weights with samples from specialized environments to optimize performance of the machine learning model.

The controller may generate and present UI imagery 32 on the display device 20 that contains three frequency band controls 34-1-34-3, which correspond, respectively, to the three frequency bands 30-1-30-3. Each of the three frequency band controls 34-1-34-3 may be given a particular visual characteristic, such as a size, a shape, a textual color, a background color, or any other suitable characteristic based on whether the corresponding frequency bands 30-1-30-3 are jammed, not jammed, or are undetermined. In this example the visual characteristic is a color and a particular color may be used to indicate which of the frequency bands 30-1-30-3 are jammed, not jammed, or are undetermined.

In this example, a background of the frequency band control 34-1 is colored red to indicate that the frequency band 30-1 is jammed. The backgrounds of the frequency band controls 34-2 and 34-3 are colored green to indicate that the frequency bands 30-2 and 30-3 are not jammed.

The user 26 selects the frequency band 30-1 by touching the corresponding frequency band control 34-1 on the display device 20 to cause the controller 24 to enter a jamming direction mode. The user 26 may then rotate an antenna 36, such as a non-azimuth (non-omnidirectional) antenna, that is coupled to the radio 22 360 degrees. As the user 26 is rotating the antenna 36, the radio 22 provides signal waveform information that corresponds to the frequency band 30-1, such as a signal waveform to the controller 24 that is received by the radio 22 from a 360 span about the radio.

The controller 24 determines a signal extrema of the signal waveform, and may generate and present, on the display device 20, user interface imagery that indicates a direction of the jamming source. In one implementation, the controller 24 may measure signal amplitude as a function of angle to determine a direction of the jamming source. The mobile device 12 may provide this information (sometimes referred to herein as direction find data point(s)), for example, to the central control device 28 for tactical decision making, and to other JDSs 10 via the mesh network. The mobile device 12 may also generate a UI that depicts a heatmap with jamming direction and present the UI on the display device 20.

Figure 3:
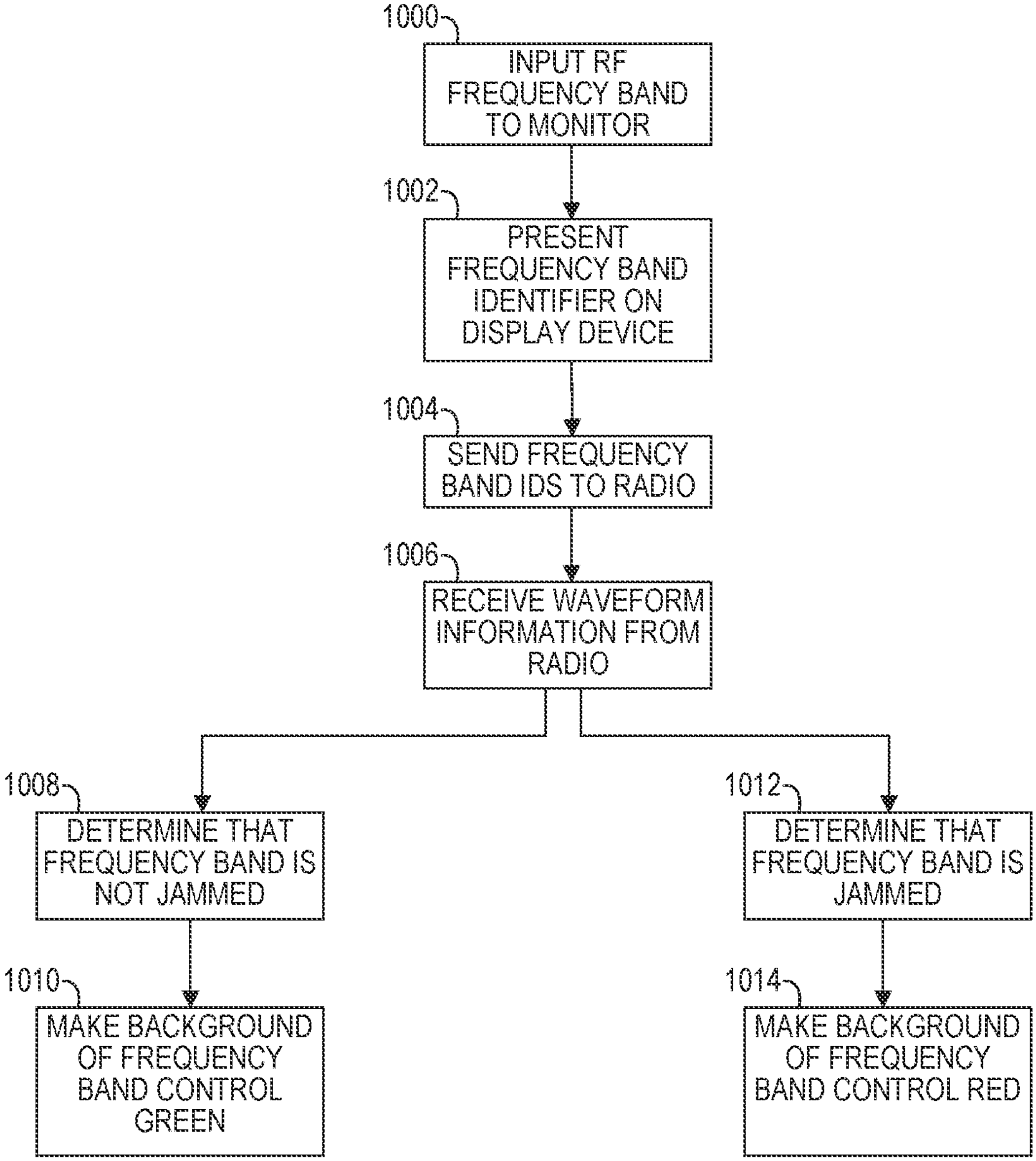
FIG. 3 illustrates a process for detecting RF jamming according to one embodiment.

FIG. 3 illustrates a process for detecting RF jamming according to one embodiment. The user 26 inputs, into the mobile device 12, one or more frequency bands to monitor for jamming (block 1000). The controller 24 may then present frequency band identifiers on the display device 20 (block 1002). The controller 24 instructs the radio 22 to continuously measure power on the designated frequency bands (block 1004). The radio 22 provides RF waveform information from the associated frequency bands to the controller 24 (block 1006). The controller 24 determines, as discussed above, whether the frequency bands are being jammed. If the controller 24 determines at block 1008 that a frequency band is not being jammed, the controller 24 can present on the display device 20 a visual characteristic that corresponds to a non-jammed frequency band, such as making the background color of the frequency identifier green (block 1010). If the controller 24 determines at block 1012 that a frequency band is being jammed, the controller 24 can present on the display device 20 a visual characteristic that corresponds to a jammed frequency band, such as making the background color of the frequency identifier red (block 1014).

Figure 4:
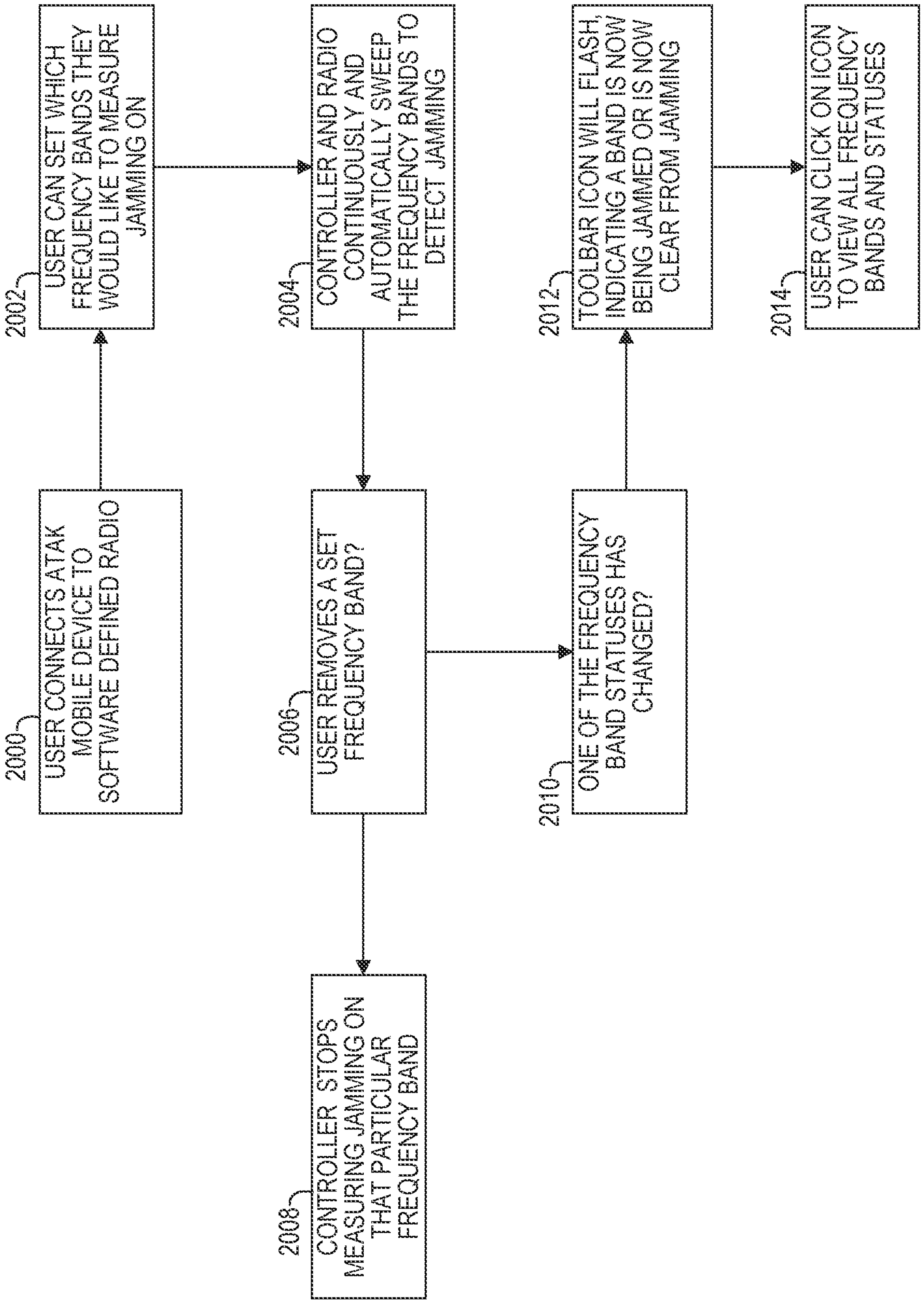
FIG. 4 is a flowchart illustrating operation of a mobile device illustrated in FIG. 1 according to one embodiment.

FIG. 4 is a flowchart illustrating operation of the mobile device 12 according to one embodiment. In some implementations, the controller 24 operates in conjunction with ATAK (Android Tactical Assault Kit) software. ATAK provides geospatial data and communication across units (block 2000). The user 26 can identify one or more frequency bands to monitor (block 2002). The mobile device 12 via the controller 24 in conjunction with the radio 22 continuously monitors the designated frequency bands (block 2004). The user 26 can, via the UI, remove a designated frequency band (block 2006). In response, the controller 24 may send a signal to the radio 22 to stop providing signal information for the designated frequency band (block 2008). The controller 24 may determine that a status of a frequency band has changed, such as from being jammed to not being jammed, or vice versa (block 2010). The controller 24 may cause an icon on the UI being presented on the display device 20 to begin flashing to indicate a monitored frequency band is being jammed, or is not being jammed (block 2012). The user 26 can select the icon, and in response the controller 24 presents each monitored frequency band and the jamming status of each frequency band (e.g., jammed or not jammed).

Figure 5:
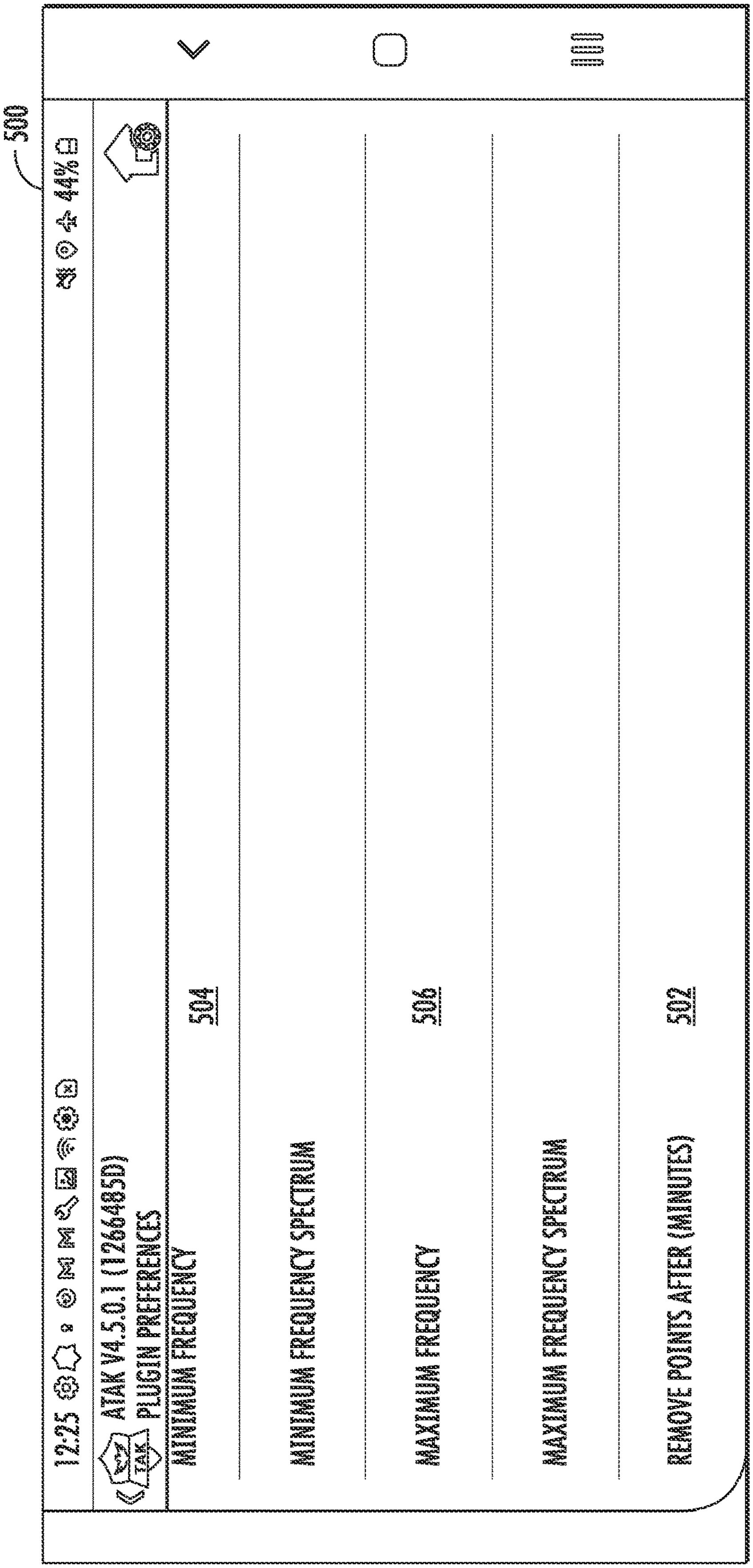
FIG. 5 illustrates a user interface (UI) that may be presented on a display device to allow a user to set certain configuration options for a controller of a JDS according to some embodiments.

FIG. 5 illustrates a UI 500 that may be presented on the display device 20 to allow the user 26 to set certain configuration options for the controller 24 according to some embodiments. As will be discussed in greater detail below, at times the controller 24 may present on the display device 20 a map (sometimes referred to herein as a heatmap) and location identifiers that identify a current location of one or more other JDSs 10 from which the JDS 10-1 receives messages, on the map. As the one or more other JDSs 10 move, the controller 24 may present a number of location identifiers that show not only the current location but previous locations of the one or more other JDSs 10, and thus the user 26 can determine a movement direction of such other JDSs 10. The location identifiers may be referred to as points. The user 26 may select an option 502 via which the user 26 can identify an amount of time that location identifiers of other JDSs 10 are removed from the map. The user 26 may select options 504 and 506 via which the user 26 can identify minimum and maximum frequencies, respectively, to set thresholds on what frequencies may be monitored.

Figure 6:
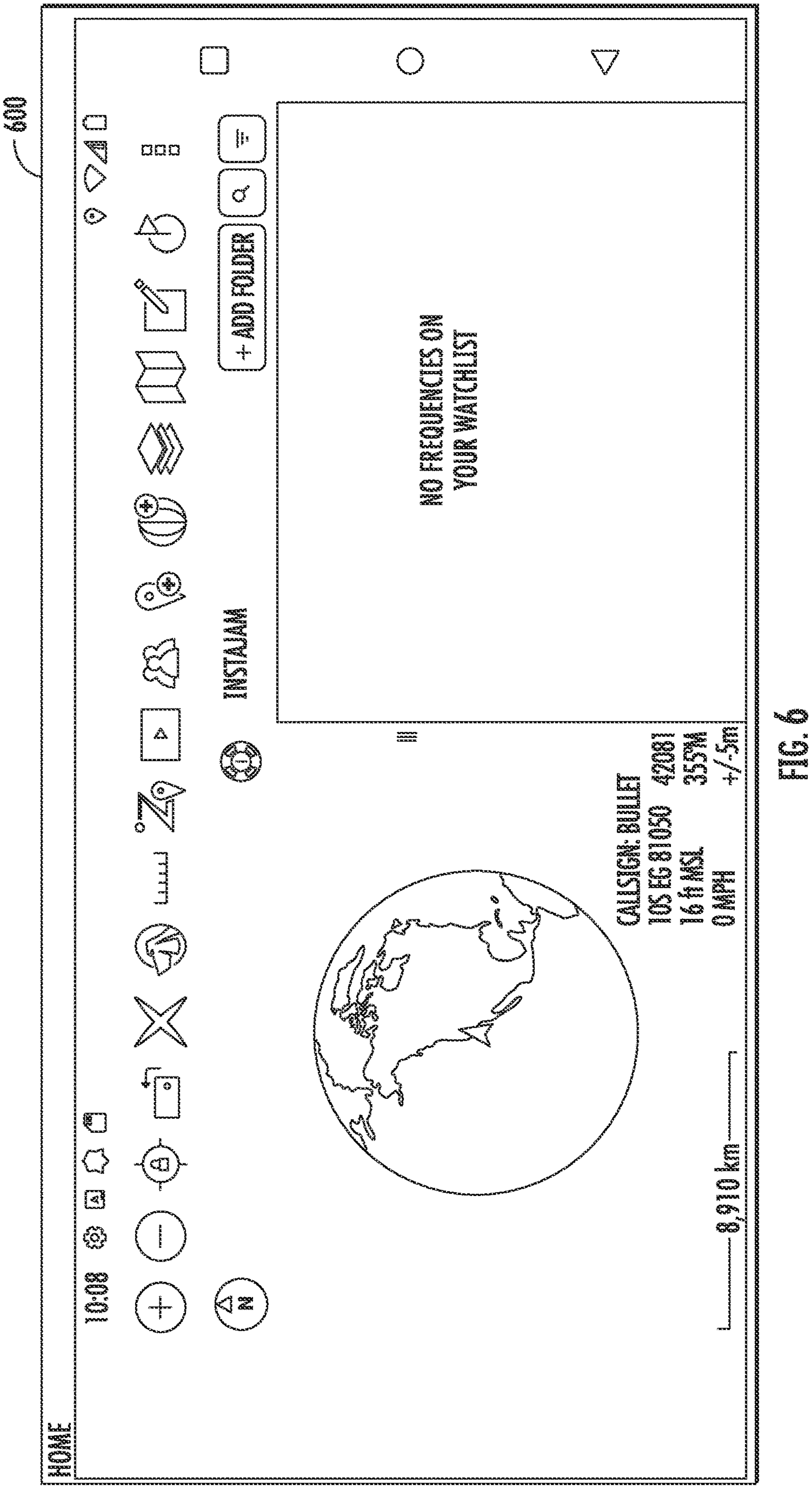
FIG. 6 illustrates a home screen UI that may be presented on a display device according to one embodiment.

FIG. 6 illustrates a home screen UI 600 that may be presented on the display device 20 according to one embodiment. At the point in time illustrated in FIG. 6, the user has not yet identified any frequency bands to monitor.

Figure 7:
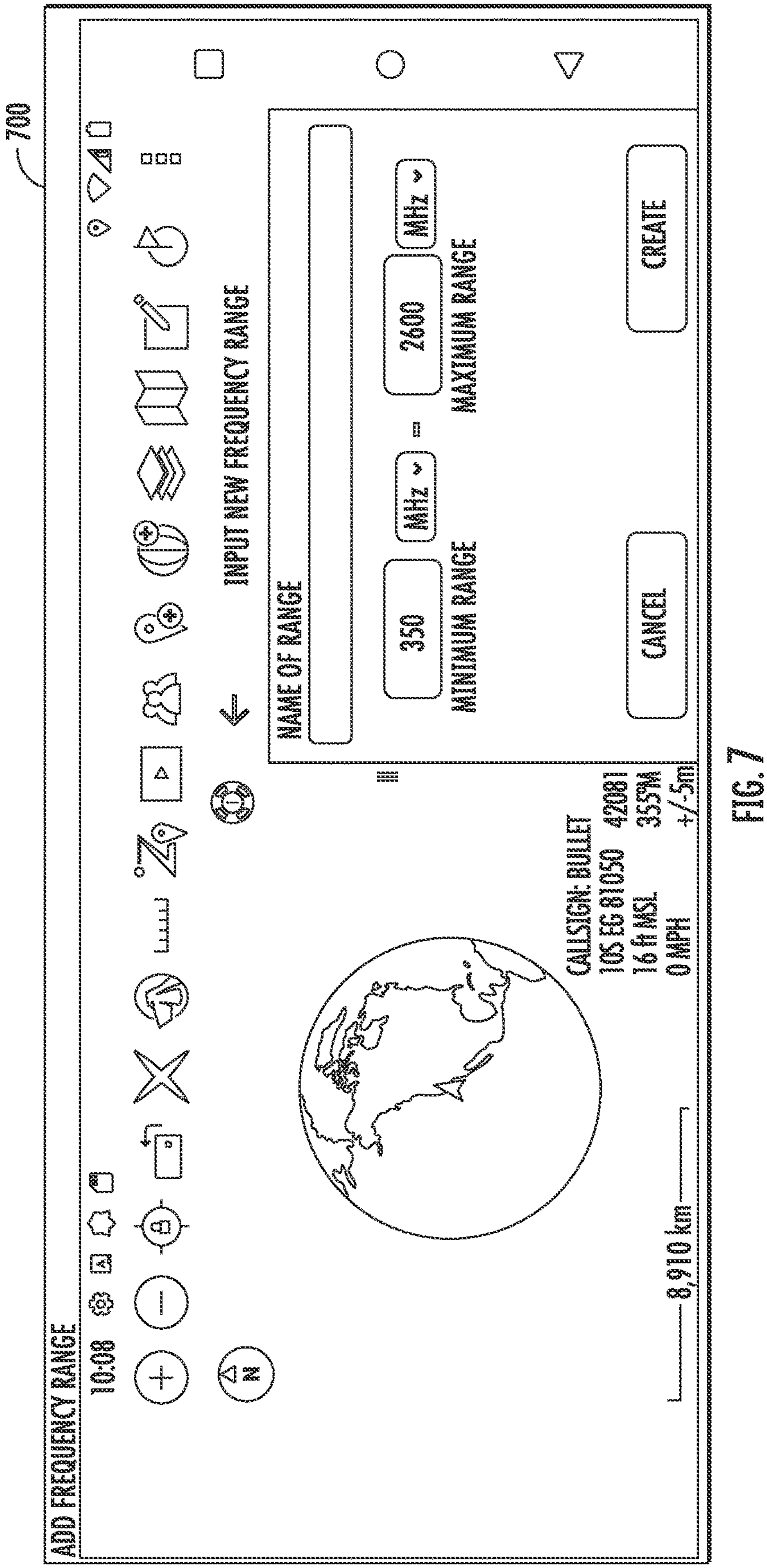
FIG. 7 illustrates a UI that may be presented on the display device to facilitate the entry of a frequency band to monitor according to one embodiment.
Figure 8:
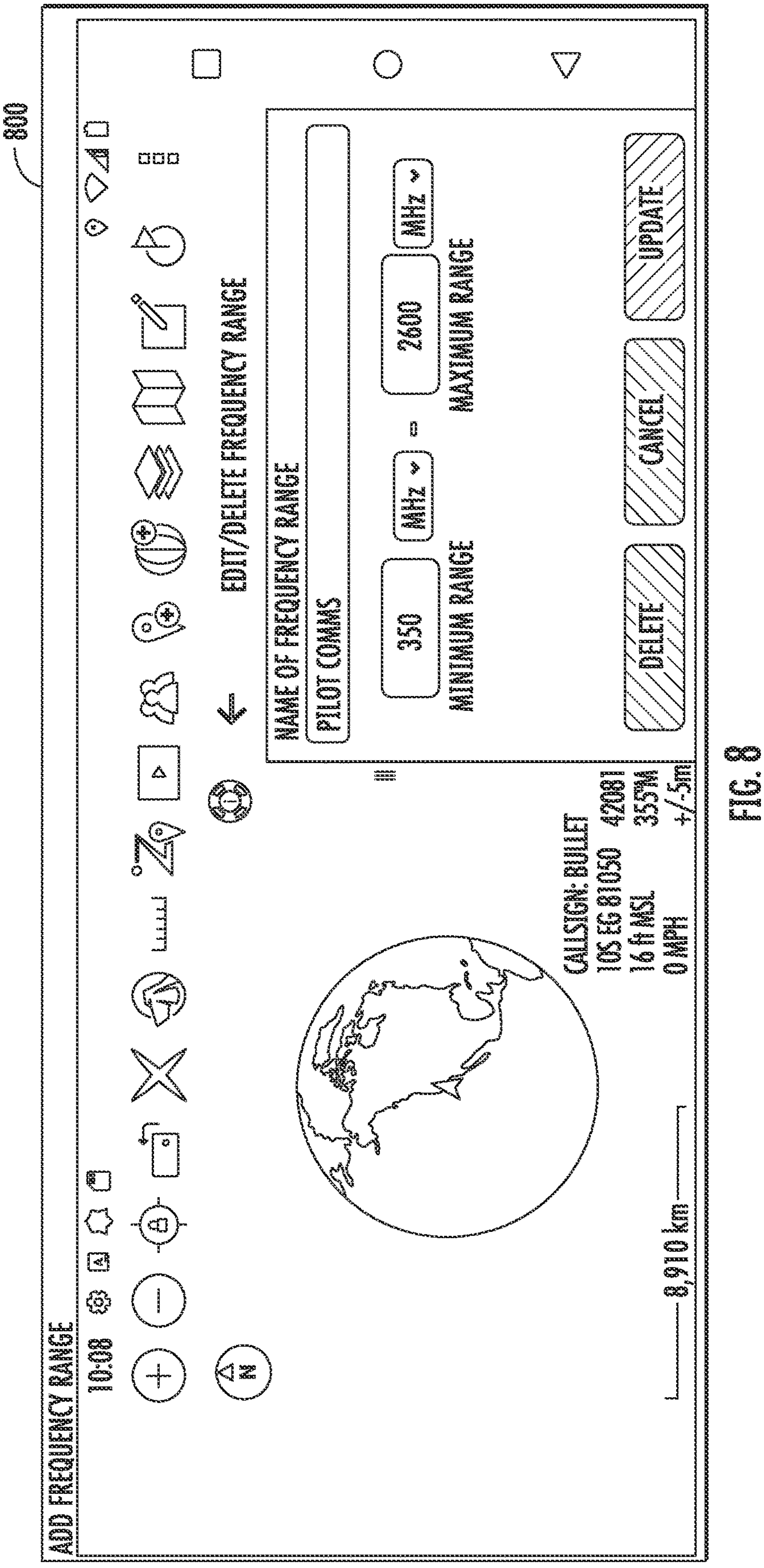
FIG. 8 illustrates a UI in which a user has provided a label, or name, of the frequency band entered in the UI illustrated in FIG. 7.

FIG. 7 illustrates a UI 700 that may be presented on the display device 20 to facilitate the entry of a frequency band to monitor. In this example the user 26 has entered a frequency band from 350 MHz to 2600 MHz to monitor. FIG. 8 illustrates a UI 800 in which the user 26 has provided a label, or name, of the frequency band entered in the UI 700 illustrated in FIG. 7. The user 26 has called the frequency band "PILOT COMMS".

Figure 9:
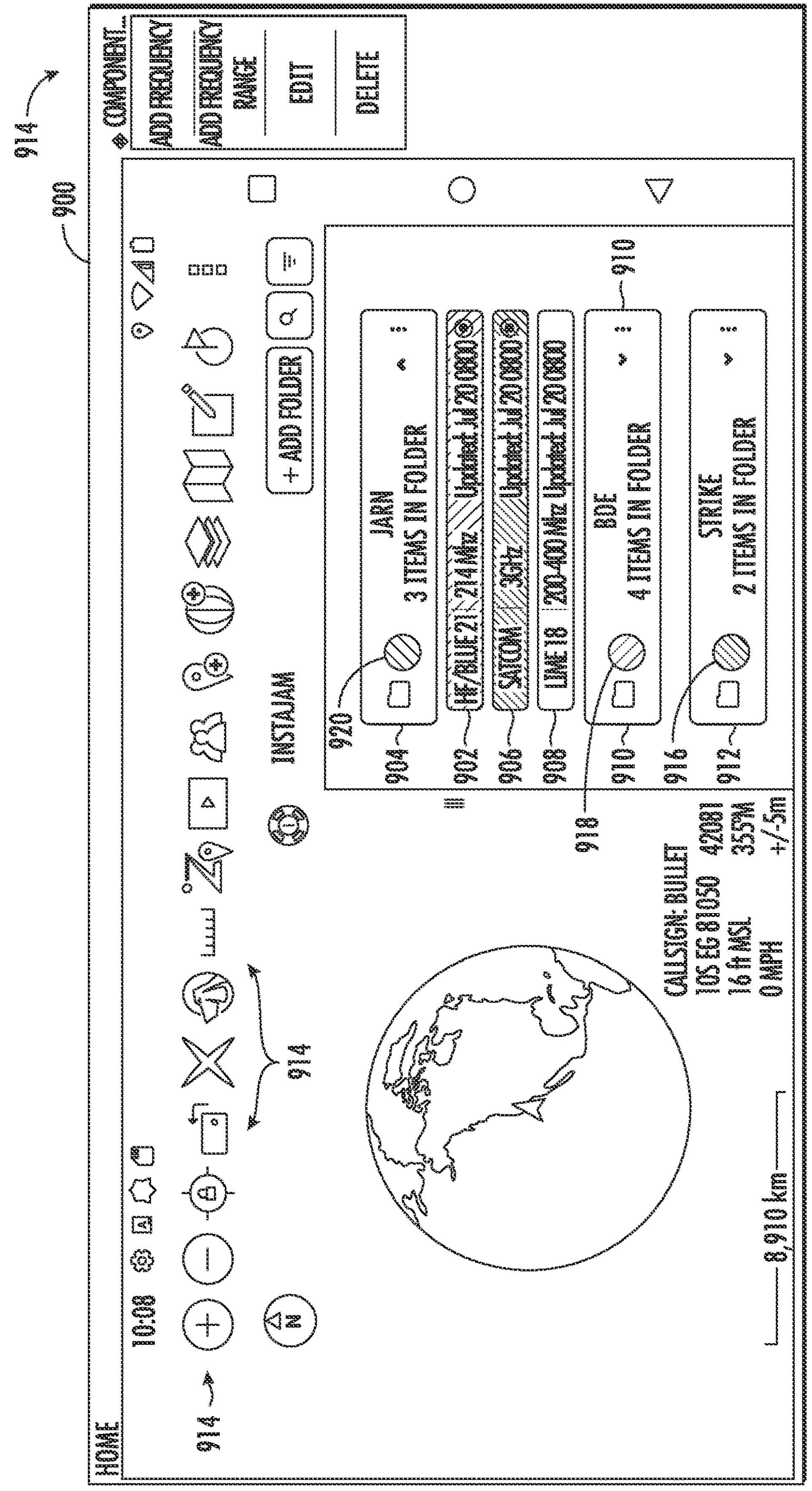
FIG. 9 illustrates a UI that may be presented on the display device according to another embodiment.

FIG. 9 illustrates a UI 900 that may be presented on the display device 20 according to another embodiment. In this embodiment, the user 26 has previously identified a plurality of different frequency bands, and had the frequency bands organized into folders. In this example, as indicated by an HF/BLUE21 frequency control 902, the user 26 has defined a 214 MHz frequency band, given it a name of HF/BLUE21 and stored it in a folder named JARN. The JARN folder is represented by a JARN folder control 904. The user 26 has also defined a 3 GHz frequency band, given it a name of SATCOM and stored it in the JARN folder as indicated by a SATCOM frequency control 906. The user 26 has also defined a frequency band of 200-400 MHz, given it a name of LIME18, and stored it in the JARN folder, as indicated by a LIME18 frequency control 908.

The user 26 has defined four other frequency bands and stored them in a BDE folder represented by a BDE folder control 910. The user 26 has defined two additional frequency bands and stored them in a STRIKE folder represented by a STRIKE folder control 912. The user 26 may interact with the UI 900 by one or more controls 914. The user 26 may also select a particular folder control 904, 910 or 912 to expand or collapse the view of the frequency controls that correspond to the frequency bands stored in the corresponding folders. In this example, the user 26 has selected the JARN folder control 904, and upon doing so, the controller 24 presented the frequency controls 902, 906 and 908 in the UI 900.

Each folder control 904, 910, 912 may include a visual characteristic that visually indicates a particular condition, or jamming status, of the frequency bands stored in the folder. A first condition is that no frequency band of the plurality of frequency bands stored in the corresponding folder is being jammed, the second condition is that at least one frequency band of the plurality of frequency bands stored in the corresponding folder is being jammed and at least another frequency of the plurality of frequency bands is not being jammed, and a third condition is that all frequency bands stored in the corresponding folder are being jammed.

The visual characteristic may comprise any desired visually distinguishing feature, such as shape of the folder control 904, 910, 912, size, outline thickness, background color, textual explanation, or the like. In this example, color-coding is used to visually distinguish the three different conditions. In this example, a red dot icon 916 indicates that all frequency bands (two) stored in the STRIKE folder are being jammed. A green dot icon 918 indicates that all (four) frequency bands in the BDE folder are not jammed. The user 26 can also filter frequency bands by name, date added, and jamming status to view the relevant frequency bands on the home screen.

A frequency control may also be given a visual characteristic to allow the user 26 to see the jamming status of any particular frequency band. In this example, the HF/BLUE21 frequency control 902 is given a green background color to indicate that the frequency band that corresponds to the HF/BLUE21 frequency control 902 (214 MHz) is not jammed. The SATCOM frequency control 906 is given a red background color to indicate that the frequency band that corresponds to the SATCOM frequency control 906 (3 GHz) is jammed.

FIGS. 10A-10D illustrate a heatmap UI 1100 that may be presented on the display device 20 according to one embodiment. In this embodiment, the JDS 10-1 has formed a mesh network with the JDSs 10-2 and 10-3. At the point in time illustrated in FIG. 10A, the JDS 10-1 has not yet received an update from the JDSs 10-2 and 10-3. The UI 1100 indicates a location of the JDS 10-1 with an arrow 1102 on a map 1104.

Figure 10A:
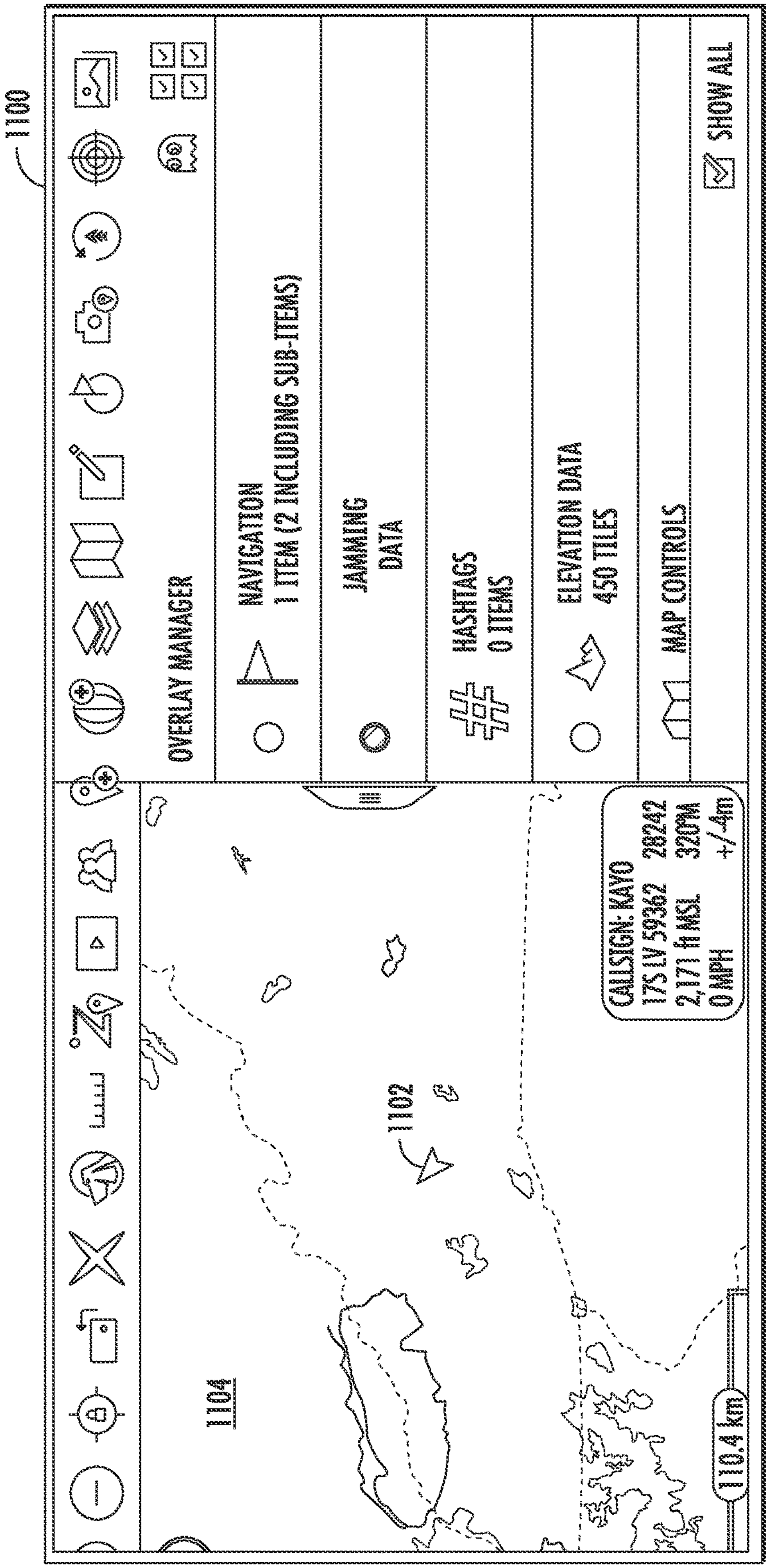
FIGS. 10A-10D illustrate a heatmap UI that may be presented on the display device according to some embodiments.
Figure 10B:
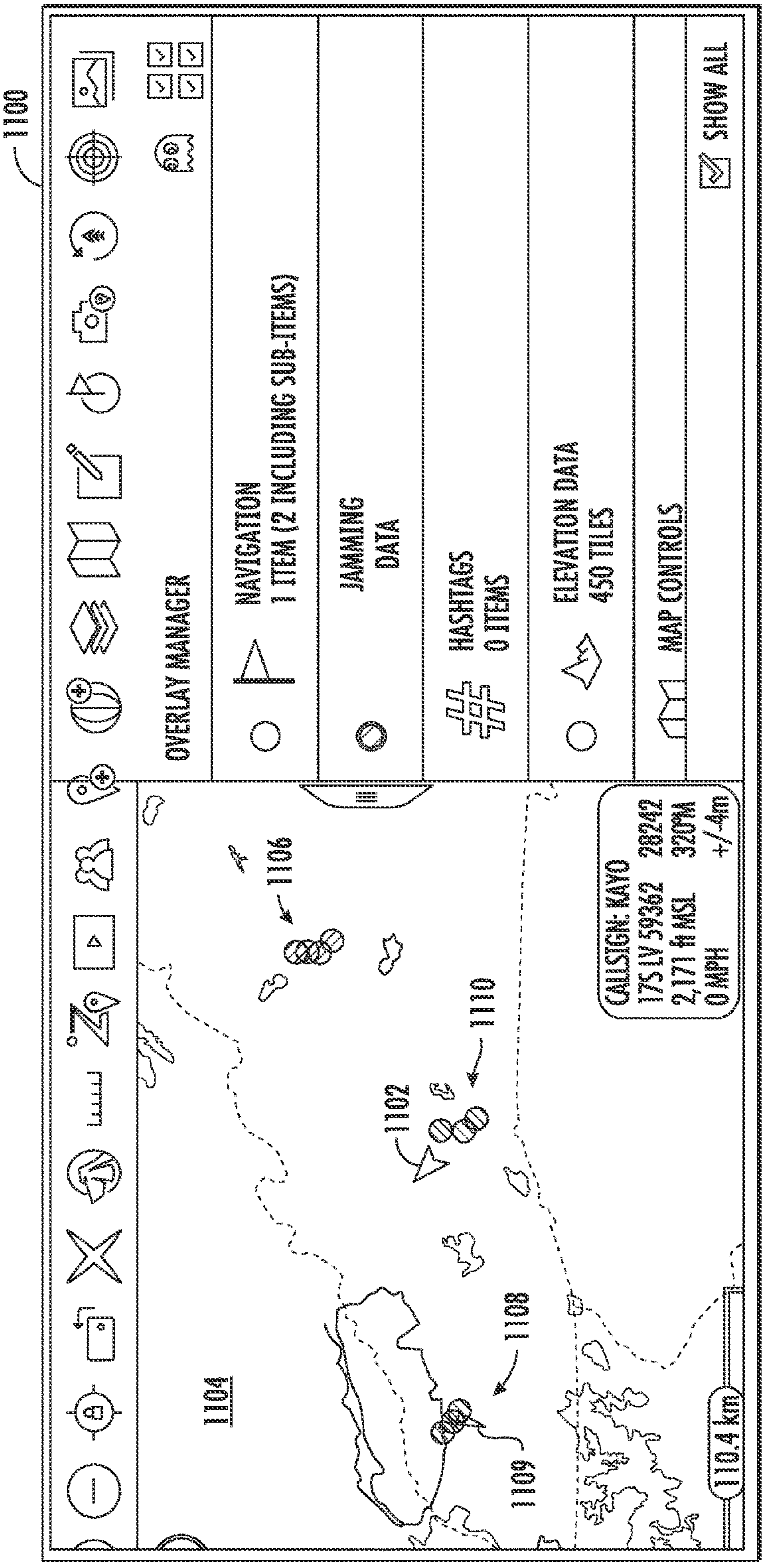

FIG. 10B illustrates an update of the UI 1100 after the mobile device 12 has received multiple messages from the other JDSs 10 over a period of time. The messages may include information such as, for example, a timestamp, a current latitude and longitude of the location of the sending JDS 10, a cardinal direction of jamming of a frequency band detected by the sending JDS 10, a frequency band identifier that identifies a frequency band that is being monitored by the sending JDS 10, a jamming status (e.g., jammed, not jammed, mixed, unknown) of each such frequency band, and raw signal characteristics (e.g., amplitude, sample rate, power) of each such frequency band.

In this example, the controller 24 includes in the UI 1100 a plurality of dots 1106, each of which corresponds to a location of the JDS 10-2 according to the location information provided in messages from the JDS 10-2 at previous points in time. The dots 1106 may be color coded according to a jamming status of a particular frequency band. In this example, the dots 1106 are green, indicating that the particular frequency band is not jammed at the location of the JDS 10-2. One of the dots 1106 may have a visual characteristic that identifies that dot 1106 as the most recent location of the JDS 10-2. The visual characteristic may, for example, be a deeper shade of green than the other dots 1106, a thicker outline, or any other desirable distinguishing visual characteristic. As the dots 1106 "age", their color may fade, eventually disappearing from the map.

In this example, the controller 24 also includes in the UI 1100 a plurality of dots 1108, each of which corresponds to a location of the JDS 10-3 according to the location information provided in messages from the JDS 10-3 at previous points in time. Again, the dots 1108 may be color coded, or have some other distinguishing visual characteristic, based on a jamming status of a particular frequency band. In this example, the dots 1108 are red, indicating that the particular frequency band is jammed at the location of the JDS 10-3. One of the dots 1108 may have a visual characteristic that identifies that dot 1108 as the most recent location of the JDS 10-3. The JDS 10-1 has received a jamming direction from the JDS 10-3, which is depicted in the UI 1100 via an arrow 1109.

The controller 24 presents a plurality of dots 1110 that correspond to the location of the JDS 10-1 over the period of time.

Figure 10C:
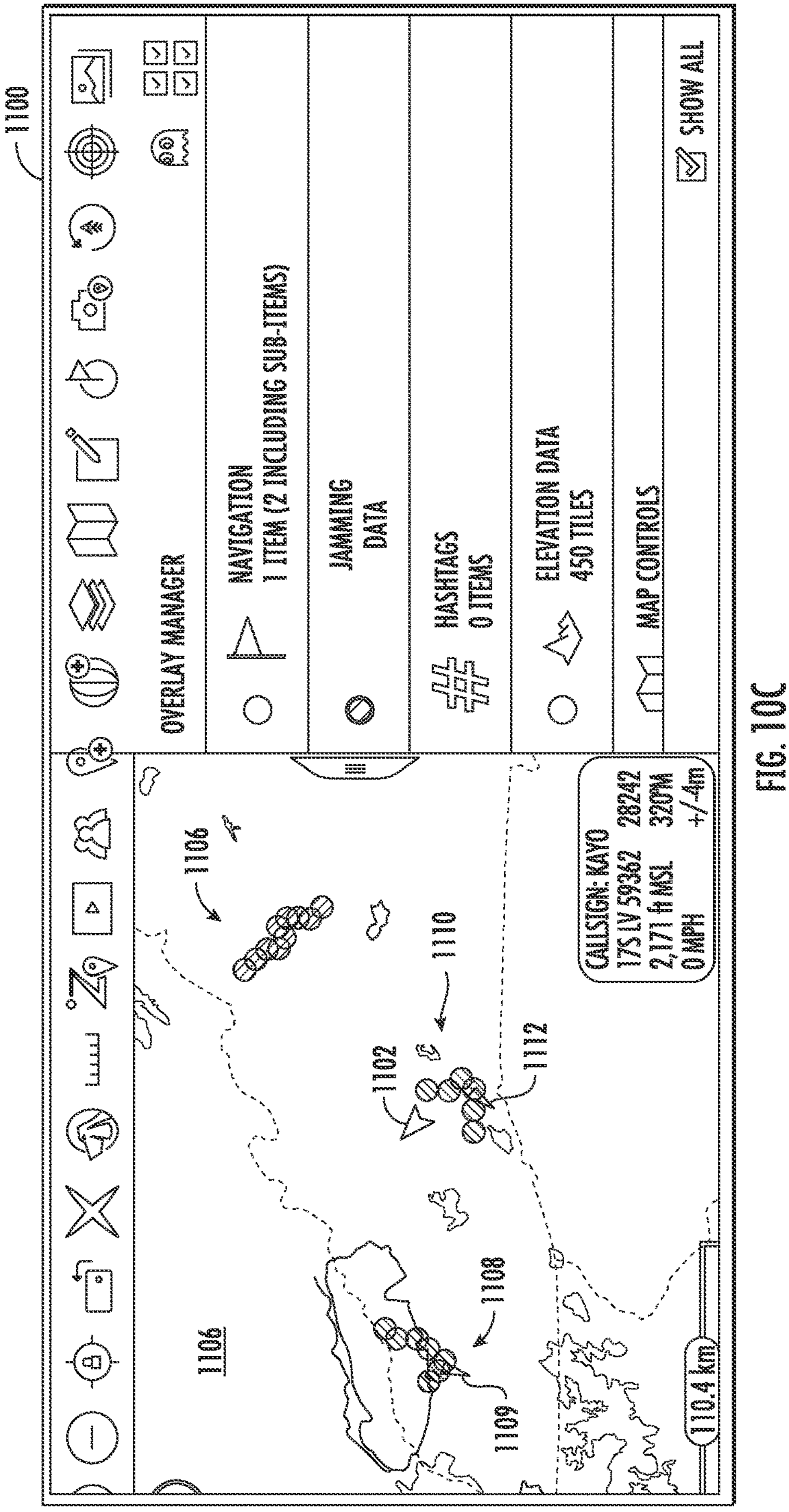

FIG. 10C illustrates an additional update of the UI 1100 after the mobile device 12 has received updates from the other JDSs 10, as the JDSs 10 move. The JDS 10-1 has determined a direction of the jamming source which is depicted by an arrow 1112.

Figure 10D:
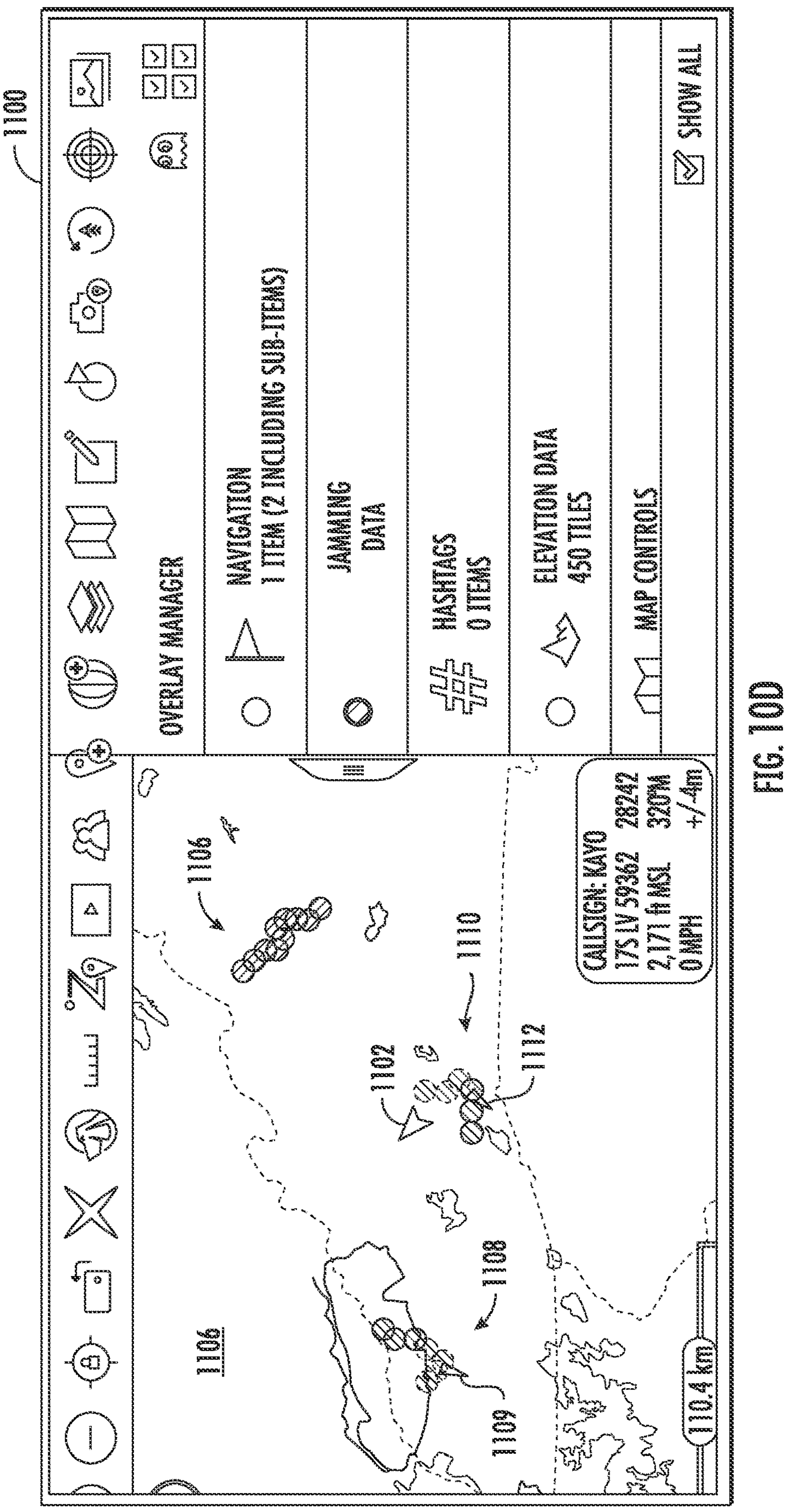

FIG. 10D illustrates an additional update of the UI 1100 after the mobile device 12 has received updates from the other JDSs 10, as the JDSs 10 move. As points get older the heatmap coloring may fade away as illustrated, for example, by certain of the dots 1106 having a darker outline than other dots 1106.

In some embodiments, the heatmap can be filtered for an individual frequency band or a set of frequency bands. If the direction of the jamming is reported from detection (using the non-azimuth antenna method described above), the source of jamming can be determined by refining the direction (angular range) detection aggregated in jamming detection. If an abundance of directional information is found, a finer location can be triangulated.

Figure 11:
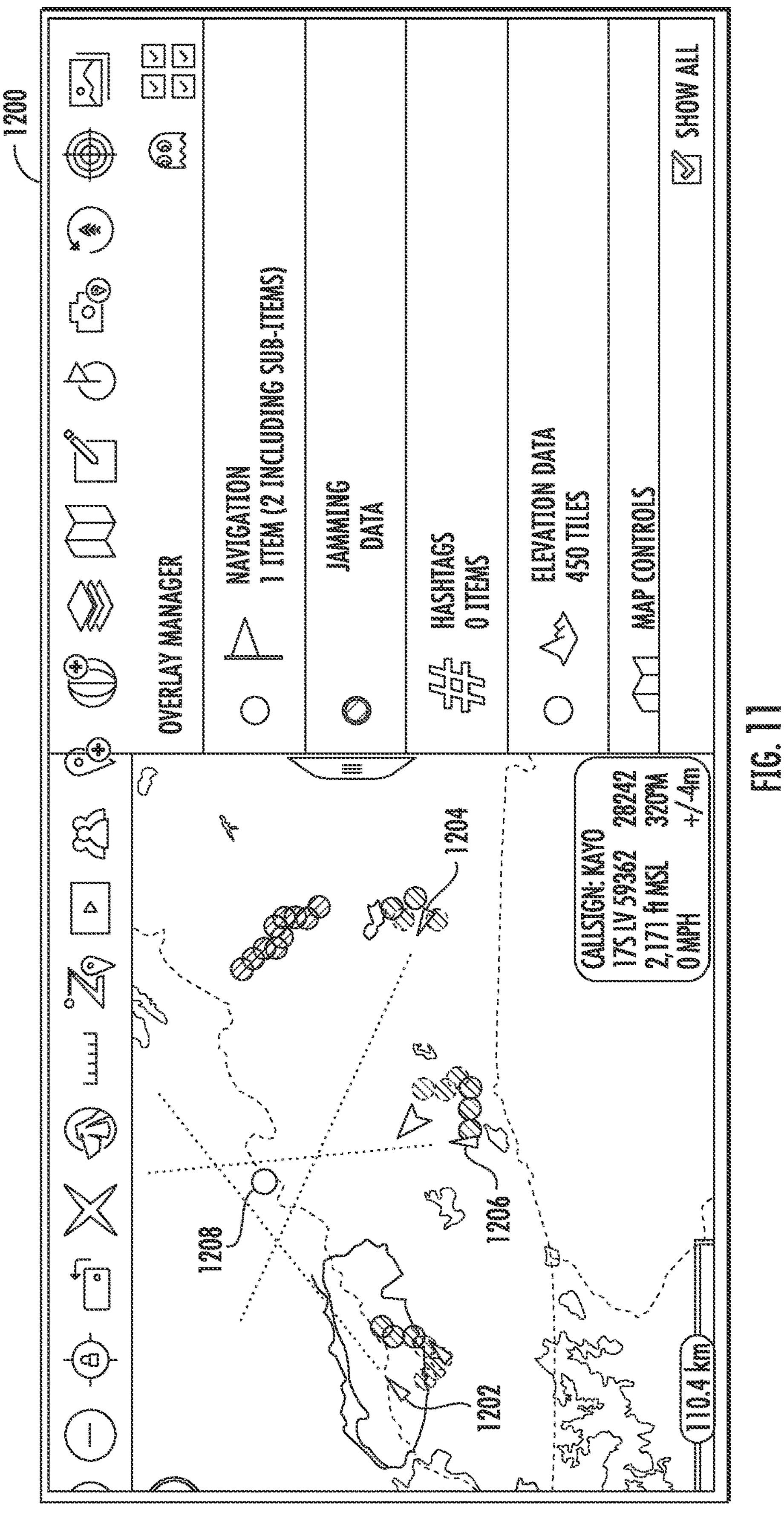
FIG. 11 illustrates a UI according to another embodiment.

FIG. 11 illustrates a UI 1200 according to another embodiment. in this embodiment the JDS 10-1 has received two direction indicators 1202 and 1204 that identify a direction of a jamming source from the perspective of two different JDSs 10. The JDS 10-1 has also determined a direction of the jamming source as indicated by a direction indicator 1206. Because the JDS 10-1 now has three directions of the jamming source, the JDS 10-1 determines a location 1208 of the jamming source and depicts the location 1208 on the UI 1200. The JDS 10-1 may also send the location of the jamming source to the other JDSs 10, as well as the central control device 28.

The JDS 10-1 generates the UI imagery 1200 that depicts a map of a geographic area that encompasses the JDSs 10. The JDS 10-1 overlays, on the map, location indicators, in this example in the form of circles, that identify locations of the other JDSs 10. The JDS 10-1 also overlays, on the map, the direction indicators 1202 and 1204 that indicate a direction of the location 1208 of the jamming source with respect to the locations of the other JDSs 10, and presents the UI imagery 1201 on the display device 20.

Figure 12:
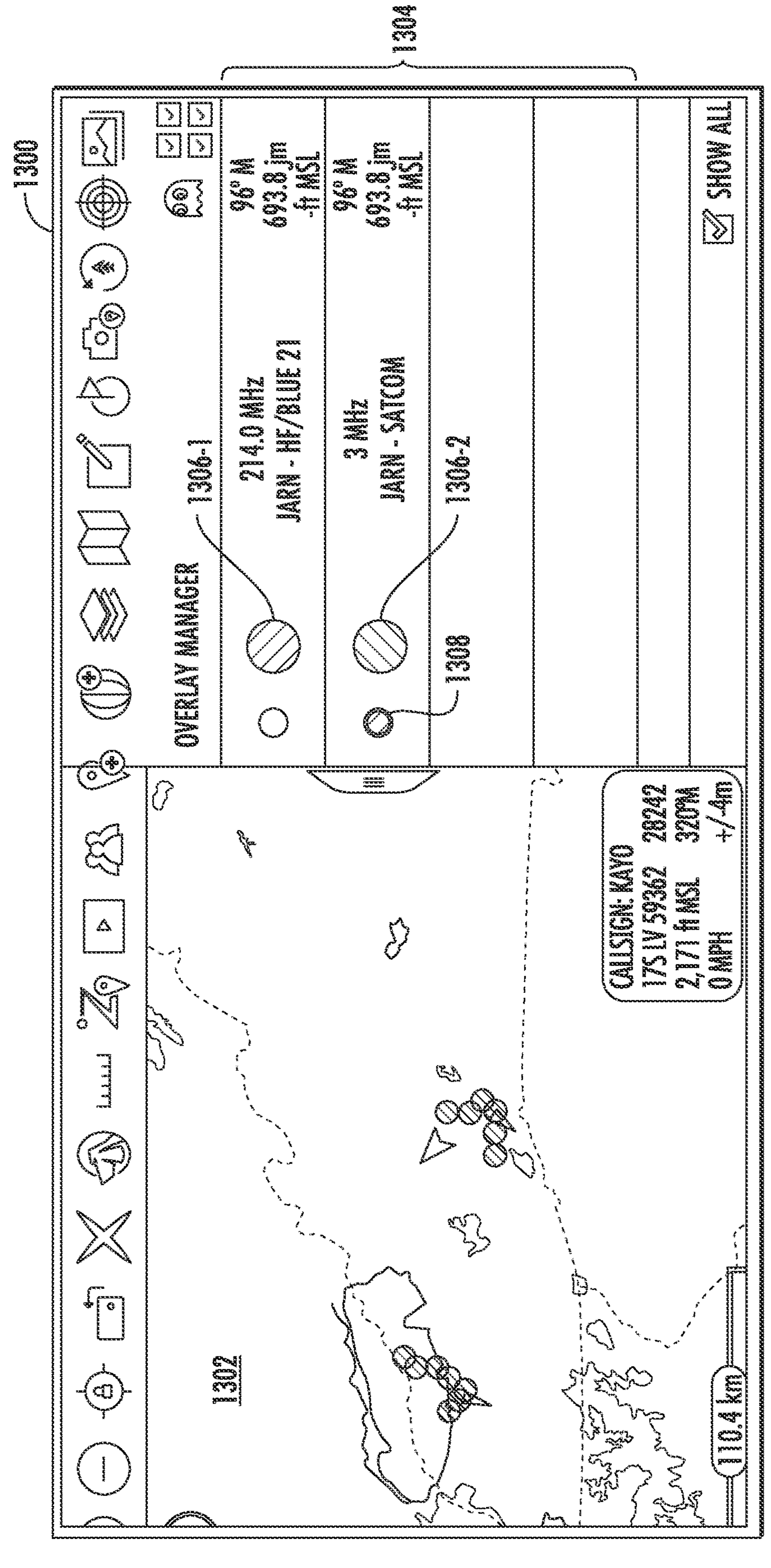
FIG. 12 illustrates a UI that allows a user to select a particular frequency band to plot on a map according to one embodiment.

FIG. 12 illustrates a UI 1300 that allows the user 26 to select a particular frequency band to plot on a map 1302. In this example, the UI 1300 provides a scrollable frequency identifier area 1304 via which the user 26 can scroll through all monitored frequencies and select a particular frequency for presentation on the map 1302. The frequency identifier area 1304 may present jamming status indicators 1306-1 and 1306-2 that indicate a current jamming status of each frequency band. In this example, the jamming status indicator 1306-1 is green, indicating that the frequency band 214 MHz is not being jammed. The jamming status indicator 1306-2 is red, indicating that the frequency band 3 MHz is being jammed. The user 26 has selected a radio button 1308 to select the 3 MHz frequency band. Thus, the map 1302 presents the direction information and jamming status information of only the 3 MHz frequency band determined by the JDS 10-1 and received from any other JDSs 10.

It is noted that, because the controller 24 is a component of the JDS 10-1 and the mobile device 12, functionality implemented by the controller 24 may be attributed to the mobile device 12 or the JDS 10-1 generally. Moreover, in examples where the controller 24 comprises software instructions that program the processor device 14 to carry out functionality discussed herein, functionality implemented by the controller 24 may be attributed herein to the processor device 14.

Figure 13:
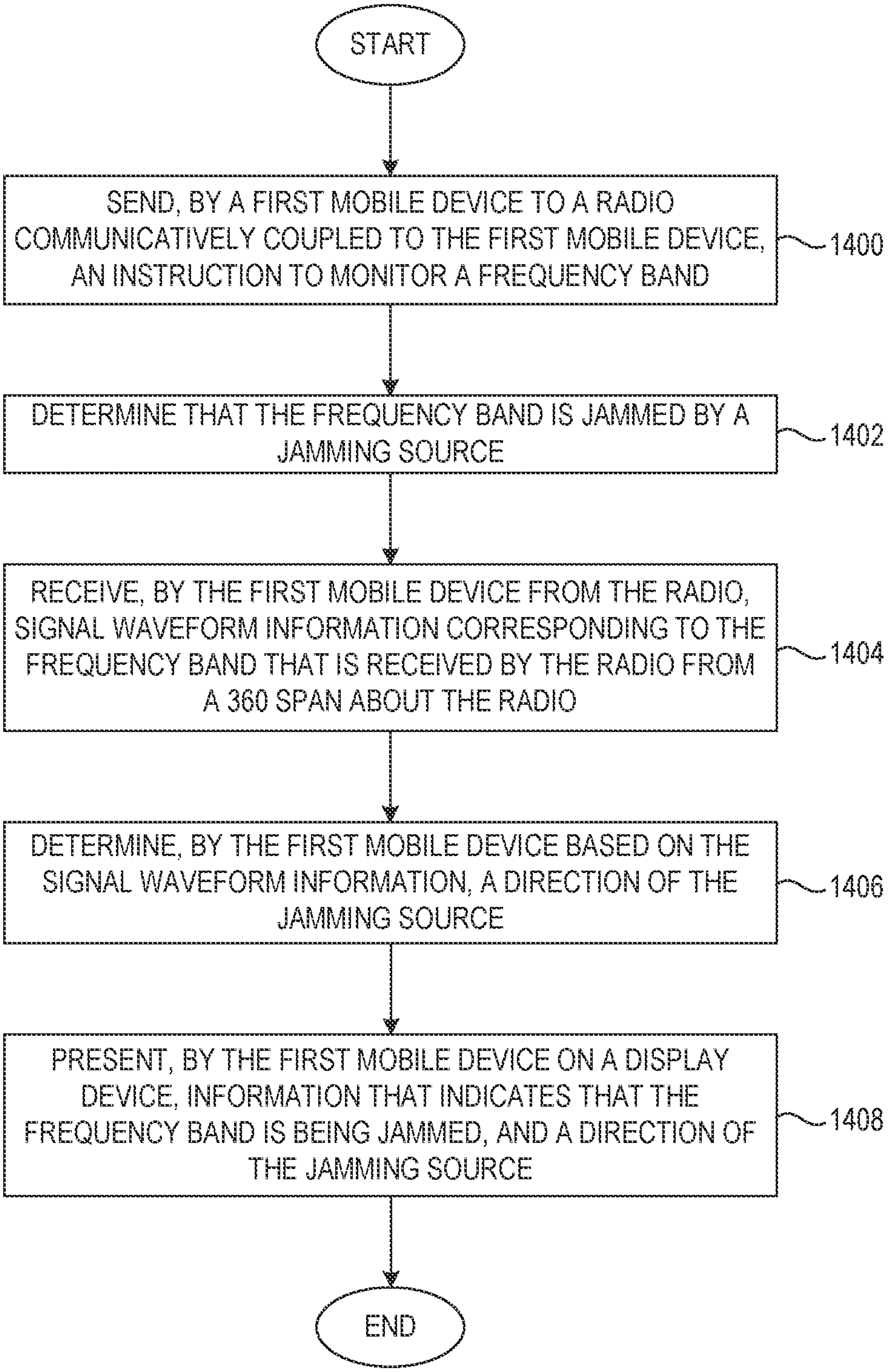
FIG. 13 is a flowchart of a method for frequency jamming detection and jammer direction detection according to one embodiment.

FIG. 13 is a flowchart of a method for frequency jamming detection and jammer direction detection according to one embodiment. FIG. 12 will be discussed in conjunction with FIG. 1. The mobile device 12 sends to the radio 22 communicatively coupled to the mobile device 12, an instruction to monitor a frequency band (FIG. 13, block 1400). The mobile device 12 determines that the frequency band is jammed by a jamming source (FIG. 13, block 1402). The mobile device 12 receive, from the radio 22, signal waveform information corresponding to the frequency band that is received by the radio 22 from a 360 span about the radio 22 (FIG. 13, block 1404). The mobile device 12 determines, based on the signal waveform information, a direction of the jamming source (FIG. 13, block 1406). The mobile device 12 presents, on the display device 20, information that indicates that the frequency band is being jammed, and a direction of the jamming source (FIG. 13, block 1408).

Figure 14:
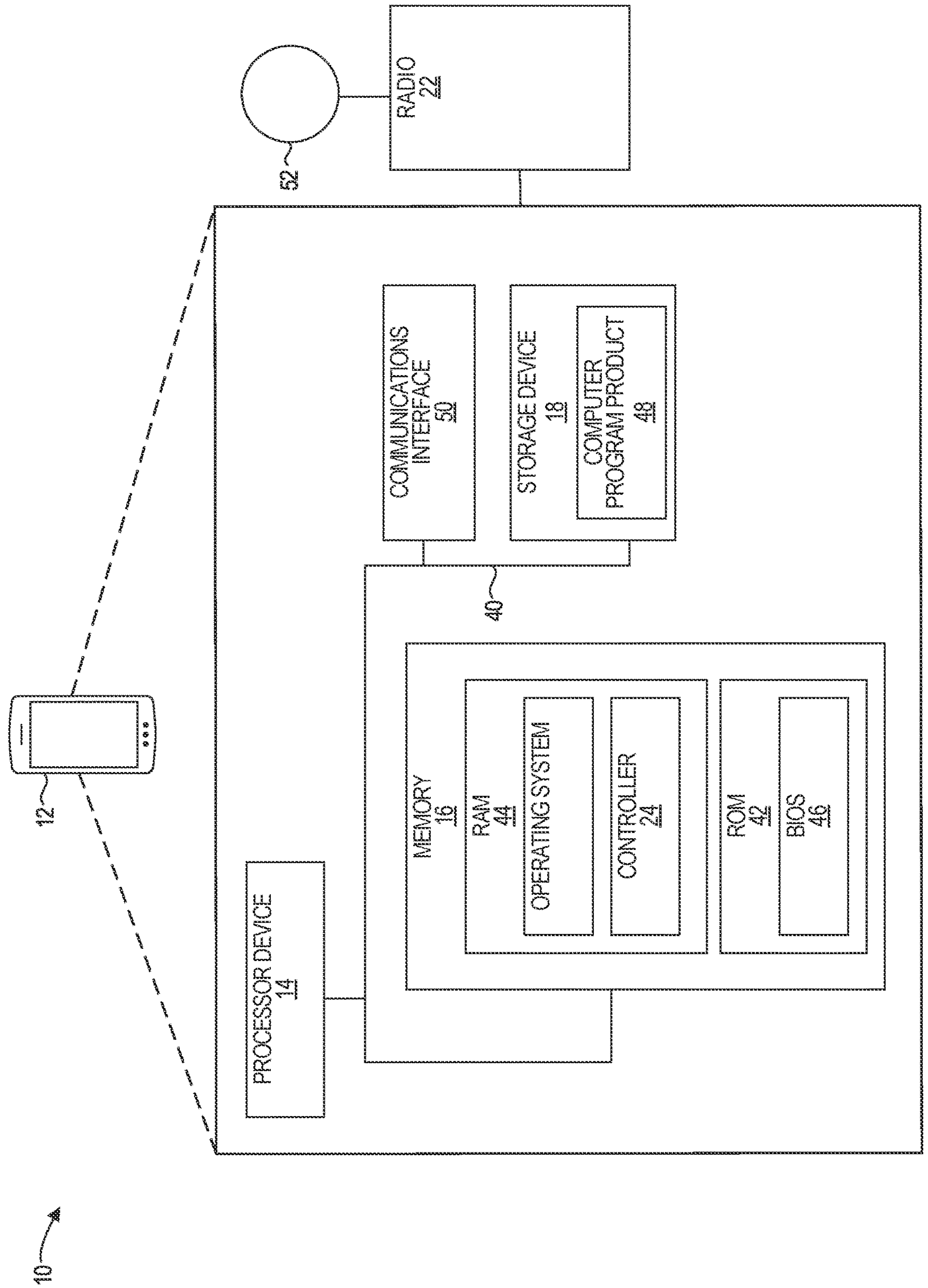
FIG. 14 is a block diagram of a JDS according to one embodiment.

FIG. 14 is a block diagram of a JDS 10 according to one embodiment. The JDS 10 incudes the mobile device 12, which may comprise any portable computing or electronic device capable of including firmware, hardware, and/or executing software instructions to implement the functionality described herein, such as a laptop computing device, a smartphone, a computing tablet, or the like. The mobile device 12 includes the processor device 14, the memory 16, and a system bus 40. The system bus 40 provides an interface for system components including, but not limited to, the memory 16 and the processor device 14. The processor device 14 can be any commercially available or proprietary processor.

The system bus 40 may be any of several types of bus structures that may further interconnect to a memory bus (with or without a memory controller), a peripheral bus, and/or a local bus using any of a variety of commercially available bus architectures. The memory 16 may include non-volatile memory 42 (e.g., read-only memory (ROM), erasable programmable read-only memory (EPROM), electrically erasable programmable read-only memory (EEPROM), etc.), and volatile memory 44 (e.g., random-access memory (RAM)). A basic input/output system (BIOS) 46 may be stored in the non-volatile memory 42 and can include the basic routines that help to transfer information between elements within the mobile device 12. The volatile memory 44 may also include a high-speed RAM, such as static RAM, for caching data. The mobile device 12 may further include or be coupled to a non-transitory computer-readable storage medium such as the storage device 18.

A number of modules can be stored in the storage device 18 and in the volatile memory 44, including an operating system and one or more program modules, such as the controller 24, which may implement the functionality described herein in whole or in part. All or a portion of the examples may be implemented as a computer program product 48 stored on a transitory or non-transitory computer-usable or computer-readable storage medium, such as the storage device 18, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the controller 24 in the volatile memory 44, may serve as a controller, or control system, for the mobile device 12 that is to implement the functionality described herein.

An operator, such as the user 26, may also be able to enter one or more configuration commands through a keyboard (not illustrated), a pointing device such as a mouse (not illustrated), or a touch-sensitive surface such as the display device 20. The mobile device 12 may also include one or more communications interfaces 50 suitable for communicating with the network 27 as appropriate or desired and the radio 22. The radio 22 may include an antenna 52. The radio 22 may be communicatively coupled to the mobile device 12 via any suitable wired or wireless communications interface, such as a USB or USB-C connector, Wi-Fi®, Bluetooth, ZigBee or the like.

Individuals will recognize improvements and modifications to the preferred examples of the disclosure. All such improvements and modifications are considered within the scope of the concepts disclosed herein and the claims that follow.

What is claimed is:

1. A method comprising:

sending, by a first mobile device to a radio communicatively coupled to the first mobile device, an instruction to monitor a frequency band;

determining that the frequency band is jammed by a jamming source;

receiving, by the first mobile device from the radio, signal waveform information corresponding to the frequency band that is received by the radio from a 360 span about the radio;

determining, by the first mobile device based on the signal waveform information, a direction of the jamming source; and presenting, by the first mobile device on a display device, information that indicates that the frequency band is being jammed, and a direction of the jamming source.

2. The method of claim 1 further comprising:

receiving, by the first mobile device, a frequency band identifier that identifies the frequency band; and in response to receiving the frequency band identifier, sending the instruction to monitor the frequency band.

3. The method of claim 1 further comprising:

receiving, by the first mobile device, a folder identifier that identifies a folder;

receiving, by the first mobile device, a plurality of frequency band identifiers, each frequency band identifier identifying a different frequency band of a plurality of frequency bands;

determining that the plurality of frequency band identifiers are associated with the folder;

determining a jamming status of each frequency band of the plurality of frequency bands;

presenting, on the display device, a user interface (UI) that depicts a folder control that corresponds to the folder identifier; and providing, in the UI, one visual characteristic of at least two different visual characteristics that correspond, respectively, to two different conditions, wherein a first condition of the at least two conditions is no frequency band of the plurality of frequency bands is being jammed, and a second condition of the at least two conditions is that at least one frequency band of the plurality of frequency bands is being jammed.

4. The method of claim 3 wherein the UI that depicts the folder control that corresponds to the folder identifier does not depict information that identifies any of the frequency bands identified by the frequency band identifiers that are associated with the folder.

5. The method of claim 4 further comprising:

receiving, by the first mobile device, a selection of the folder control; and in response to receiving the selection, presenting, in the UI a plurality of frequency controls, each frequency control corresponding to one of the frequency band identifiers, and for each frequency control providing either a non-jammed visual characteristic or a jammed visual characteristic based on a jamming status of the frequency band identified by the frequency band identifier to which the frequency control corresponds.

6. The method of claim 3, wherein the at least two different visual characteristics comprises three different characteristics that correspond, respectively, to three different conditions, wherein the first condition of the at least three conditions is no frequency band of the plurality of frequency bands is being jammed, the second condition of the at least two conditions is that at least one frequency band of the plurality of frequency bands is being jammed and at least another frequency band of the plurality of frequency bands is not being jammed, and a third condition of the at least three conditions is that no frequency bands of the plurality of frequency bands are being jammed.

7. The method of claim 1 further comprising:

receiving, by the first mobile device from a second mobile device, a message, the message comprising a frequency band identifier that identifies a frequency band, a location identifier identifying a current location of the second mobile device, and a jamming status that identifies whether the frequency band is jammed.

8. The method of claim 7 further comprising:

presenting, by the first mobile device on the display device, information that includes a map of a geographic area in which the first mobile device and the second mobile device are located, a location of the first mobile device and a location of the second mobile device on the map, a first direction indicator identifying a direction of a jamming source determined by the first mobile device and a second direction indicator identifying a location of a jamming source determined by the second mobile device.

9. The method of claim 7 further comprising:

receiving, by the first mobile device from the second mobile device over a period of time, a plurality of messages, each message comprising a frequency band identifier that identifies a frequency band, a location identifier identifying a current location of the second mobile device, and a jamming status that identifies whether the frequency band is jammed, wherein each location identifier identifies a different location of the second mobile device; and presenting, by the first mobile device on the display device, based on the plurality of messages, information that includes a map of a geographic area in which the first mobile device and the second mobile device are located, a location of the first mobile device and a plurality of locations of the second mobile device on the map, a first direction indicator identifying a direction of a jamming source determined by the first mobile device and a second direction indicator identifying a location of a jamming source determined by the second mobile device.

10. The method of claim 9 wherein presenting the plurality of locations of the second mobile device on the map comprises presenting a separate location indicator on the map for each location of the plurality of locations.

11. The method of claim 10 wherein presenting the separate location indicator on the map for each location of the plurality of locations further comprises altering a visual characteristic of the separate location indicator that corresponds to a most location of the second mobile device to be different from the location indicators of each other location of the second mobile device.

12. The method of claim 1 further comprising:

receiving, by the first mobile device from each of at least two other mobile devices, a message, each message comprising a frequency band identifier that identifies the frequency band, a location identifier identifying a current location of the respective mobile device, a jamming status that identifies that the frequency band is jammed, and a direction indicator identifying a direction of a jamming source determined by the respective mobile device;

determining, by the first mobile device, that the first mobile device contains three direction indicators that identify three directions of the jamming source from a perspective of three mobile devices;

triangulating, by the mobile device, a jamming source location of the jamming source; and presenting, by the first mobile device on the display device, information that includes a map of a geographic area in which the first mobile device and the jamming source are located, a location identifier identifying a current location of the first mobile device on the map, and a jamming source location identifier identifying a location of the jamming source on the map.

13. The method of claim 12, further comprising:

sending, by the first mobile device to a second mobile device, a message that includes information that identifies the frequency band and jamming source location information that identifies the location of the jamming source.

14. The method of claim 12, wherein the location identifiers that identify the current locations of the respective mobile devices and the jamming source location identifier comprise longitude and latitude values.

15. A first mobile computing device, comprising:

a display device;

a memory; and a processor device coupled to the memory configured to:

send, to a radio communicatively coupled to the first mobile device, an instruction to monitor a frequency band;

determine that the frequency band is jammed by a jamming source;

receive, from the radio, signal waveform information corresponding to the frequency band that is received by the radio from a 360 span about the radio;

determine, based on the signal waveform information, a direction of the jamming source; and present, on the display device, information that indicates that the frequency band is being jammed, and a direction of the jamming source.

16. The first mobile computing device of claim 15 wherein the processor device is further configured to:

receive a folder identifier that identifies a folder;

receive a plurality of frequency band identifiers, each frequency band identifier identifying a different frequency band of a plurality of frequency bands;

determine that the plurality of frequency band identifiers are associated with the folder;

determine a jamming status of each frequency band of the plurality of frequency bands;

present, on the display device, a user interface (UI) that depicts a folder control that corresponds to the folder identifier; and provide, in the UI, one visual characteristic of at least two different visual characteristics that correspond, respectively, to two different conditions, wherein a first condition of the at least two conditions is no frequency band of the plurality of frequency bands is being jammed, and a second condition of the at least two conditions is that at least one frequency band of the plurality of frequency bands is being jammed.

17. The first mobile computing device of claim 16 wherein the UI that depicts the folder control that corresponds to the folder identifier does not depict information that identifies any of the frequency bands identified by the frequency band identifiers that are associated with the folder.

18. The first mobile computing device of claim 17 wherein the processor device is further configured to:

receive a selection of the folder control; and in response to receiving the selection, present, in the UI a plurality of frequency controls, each frequency control corresponding to one of the frequency band identifiers, and for each frequency control provide either a non-jammed visual characteristic or a jammed visual characteristic based on a jamming status of the frequency band identified by the frequency band identifier to which the frequency control corresponds.

19. The first mobile computing device of claim 15 wherein the processor device is further configured to:

receive, from each of at least two other mobile devices, a message, each message comprising a frequency band identifier that identifies the frequency band, a location identifier identifying a current location of the respective mobile device, a jamming status that identifies that the frequency band is jammed, and a direction indicator identifying a direction of a jamming source determined by the respective mobile device;

determine that the first mobile device contains three direction indicators that identify three directions of the jamming source from a perspective of three mobile devices;

triangulate a jamming source location of the jamming source; and present, on the display device, information that includes a map of a geographic area in which the first mobile device and the jamming source are located, a location identifier identifying a current location of the first mobile device on the map, and a jamming source location identifier identifying a location of the jamming source on the map.

20. A method comprising:

receiving, by a first mobile device from a second mobile device, a first message that a first frequency band is being jammed, a first direction of a jamming source, and a first location of the second mobile device;

receiving, by the first mobile device from a third mobile device, a second message that the first frequency band is being jammed, a second direction of the jamming source, and a second location of the second mobile device;

generating, by the first mobile device, user interface imagery that depicts a map of a geographic area that encompasses the first mobile device, the second mobile device and the third mobile device;

overlaying, on the map, location indicators that identify locations of the first mobile device, the second mobile device and the third mobile device with respect to the geographic area;

overlaying, on the map, direction indicators that indicate a direction of the jamming source with respect to the first location and the second location; and presenting the user interface imagery on a display device.

* * * * *